Jan. 3, 1939.  W. H. SALE  2,142,417
BRAKE BEAM
Filed Dec. 31, 1937  2 Sheets-Sheet 2
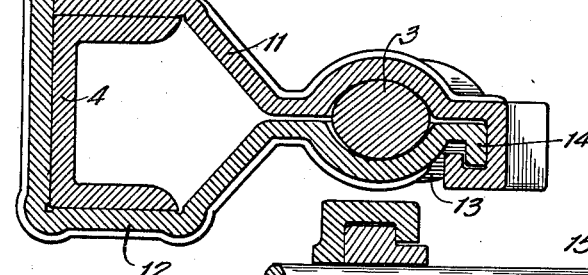
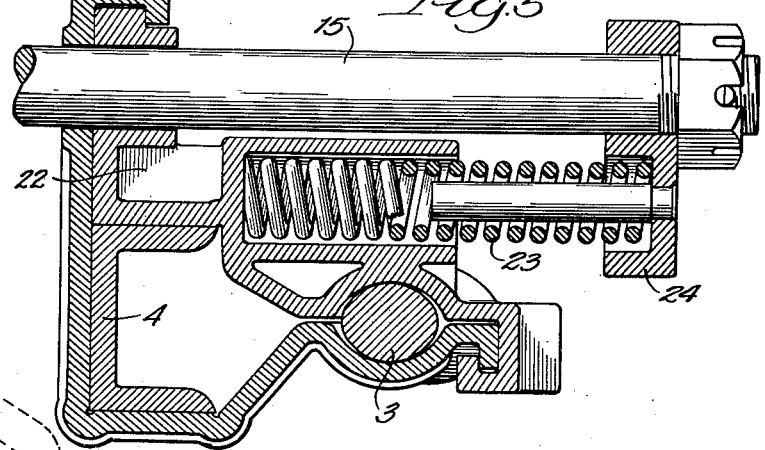
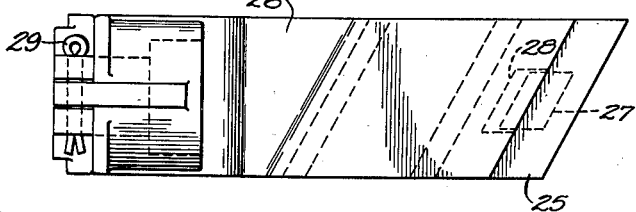
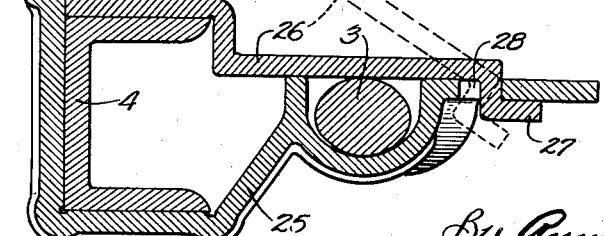
Inventor:
William H. Sale,
By Rummler, Rummler
+ Woodworth
Attorneys.

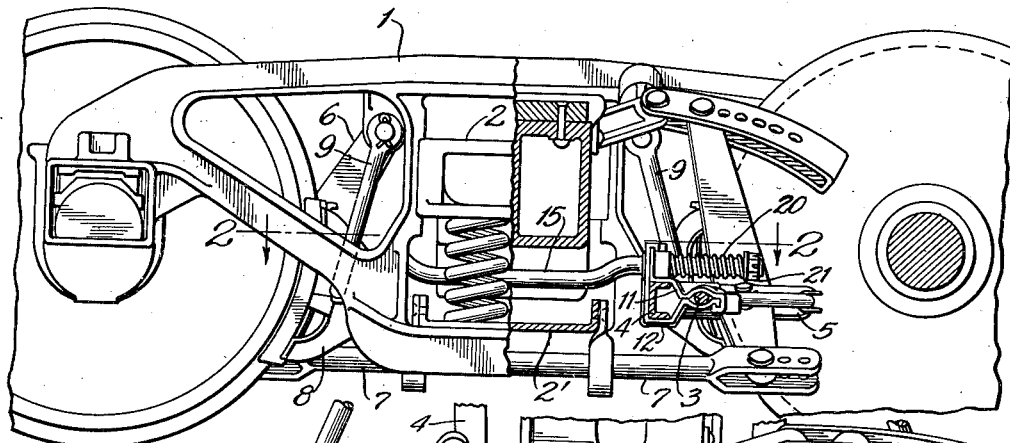

Patented Jan. 3, 1939

2,142,417

UNITED STATES PATENT OFFICE 2,142,417

BRAKE BEAM

William H. Sale, Richmond, Va., assignor to Naylor Patents Corporation, Chicago, Ill., a corporation of Delaware Application December 31, 1937, Serial No. 182,704

7 Claims. (Cl. 188—216)

The improvements in brake beam construction herein disclosed relate particularly to a tie means or interlock for supplementing customary devices for holding together the elements of a brake beam. Devices of this class are sometimes referred to as brake beam supports in that if the brake beam hangers give way or the compression and tension members of a brake beam become detached from each other or the brake head, the compression and tension members are held together and an element of the tie prevents the beam from falling and endangering railway rolling stock. Patent to Hedgcock, No. 1,143,704, June 22, 1915, is typical of the class.

The objects of this invention are to provide an interlocked tie construction whereby the brake beam connecting members serve to hold together the main elements of the beam and are not dependent upon threaded connections such as nuts and bolts. In this construction if a cotter pin or nut is lost the larger elements of the brake beam cannot fall down to the track. U-bolts are not necessary.

A further purpose of the invention is to tie together the compression and tension elements of the beam by means of a construction formed by a plurality of castings having sliding and interlocking engagement with each other and which are finally tied together to prevent accidental disassembly by a brake release tie rod. It is, therefore, an aim of the invention to provide means for keeping brake beams intact under all possible conditions and irrespective of the loss of the brake heads. These objects are accomplished by means of a construction, as illustrated in the drawings, wherein:

Fig. 1 shows a side view of a railway truck partly in section as indicated by the line 1—1, Fig. 2, and provided with the improved brake beam construction.

Fig. 2 is a fragmentary plan view of the mechanism shown in Fig. 1.

Fig. 3 shows in plan the tie members for the compression and tension elements of a brake beam with the two interlocking parts of said tie member in separated relation.

Fig. 4 is a fragmentary sectional detail taken on the plane of and at the right-hand end of the line 4—4 of Fig. 2.

Fig. 5 is a sectional detail similar to Fig. 4, but showing a modified arrangement for supporting the brake release spring.

Fig. 6 is another modification in sectional detail like Fig. 4.

Fig. 7 is a detail in plan of the brake beam tie means shown in Fig. 6.

Long experience in the use of brake beams of the general type herein illustrated has lead to various changes and improvements for safeguarding rolling railway stock, and include means for insuring prompt disengagement of the brake from the wheels when the brakes are released. This invention includes further refinements of the same character, and mainly that of making the tie elements of the brake beam in two interlocking parts which, in turn, are locked together by brake release rods. These rods couple together opposite brake beams and extend over the spring plank for the purpose of holding the beams up in case the hangers fail, and incidentally carry brake disengaging springs.

Fig. 1 of the drawings shows a railway truck frame 1 including the customary spring bolster 2 and spring plank 2', and other standard elements of a truck. Each brake beam as shown in Fig. 2, comprises compression members 4, tension members 3, and center posts or struts 5, in which are fulcrumed brake operating levers 6. These are linked together, as usual, by links 7, so that power applied to one of the levers will be transmitted to the other. Brake beam heads are indicated at 8, and the hangers at 9, Fig. 1.

The improvements of this invention relate to the tie elements 10 forming an interlocking connection for the compression and tension elements of the beams. As shown in Figs. 3 and 4, the tieing members comprise the castings 11 and 12. These are fitted together by a sliding motion of casting 11 along the tension member 3 and therefore have interlocking flanges 13 and 14, which are angularly arranged on the castings to extend in the direction of the tension members 3. The castings 11 and 12 also embrace the compression members 4, as shown in Fig. 4, and cannot be separated by movement of casting 12 along the compression member. These two castings are finally tied together by rods 15, passing through alined apertures 16 and 17 in the two parts of the tie member. The member 12 has an inclined flange 18 which fits over shoulder 19 of the part 11.

The rods 15 serve as a lock for the elements 11 and 12, which secure together the compression and tension members of the single beam. The rods also tie together a pair of beams. The latter function of tie rods 15 is the same as in the patent above-mentioned, and like the construction shown in the patent carry brake release springs 20. These springs bear between castings 11 and nut 21 on the end of the tie rod. Thus, the springs are compressed when the brakes are applied, and upon release of the brakes serve to force the brake shoes out of contact with the car wheels.

The assembly of the tie member on the beam is accomplished in a definite order as follows:

After the brake beams are assembled and in position to be installed on a truck the tie means are applied, first by placing casting 12 on compression member 4 in the location where the tension member 3 will fit the inclined seat provided for it in casting 12. Then casting 11 is placed on the tension member 3 separated from casting 12 as shown in Fig. 3, and is slid along tension member 3 into engagement with casting 12 with the interfitting flanges engaged as shown in Fig. 4. The elements 11 and 12 are finally locked together by passing the ends of tie rod 15 through the alined apertures 16 and 17. The springs 20 are placed on the rods and put under the required initial tension by nuts 21 which are locked in set position by cotters.

The modified construction shown in Fig. 5 has the same essential elements as previously described, and shown in Fig. 4, but in place of a casting 11 there is a similar casting 22 of different design and providing a pocket for seating a brake-release spring 23. This spring bears between casting 22 and a depending arm 24 on tie rod 15, rather than encircling the rod as in Fig. 4. The thrust of the spring is then somewhat better centered on the pair of brake beams.

Figs. 6 and 7 illustrate a further modification of the invention wherein instead of bringing together the two elements of the tie means for the tension and compression elements of a beam, by a sliding motion, the interfitting tie casting or forgings 25 and 26 are swung together by a hinging motion. Element 26 has a tongue 27 for engaging element 25 at the slot 28. This forms a hinge whereby after insertion of the tongue in the slot the element is swung from the dotted line position, Fig. 6, to the full line position and then pinned to member 25 at 29.

I claim:

1. In interlocking tie means for the compression and tension members of a brake beam comprising a pair of interfitting elements formed for engagement one with the other by sliding one of said elements along the tension member of the beam, and a tie rod engaging alined apertures in said elements for locking said elements together.

2. An interlocking tie means for the compression and tension members of a brake beam comprising a pair of interfitting elements formed for engagement with one another by sliding one of said elements along the tension member of the beam, means for locking said elements together, said means comprising a tie rod having the function of providing a supplemental supporting means for the beam.

3. An interlocking tie means for the compression and tension members of a brake beam comprising a pair of interfitting elements formed for engagement one with the other by sliding one of said elements along the tension member of the beam, means for locking said elements together, said means comprising a tie rod having the function of providing a supplemental supporting means for the beam, and resilient means associated with said brake beam tie for urging the beam to disengaged position.

4. A railway truck having a pair of brake beams, a tie connection between said beams comprising a tie rod and a pair of interfitting members for each beam and through which said tie rod passes, said members and tie rod forming an interlocking tie means for each beam, and resilient means carried by said interlocking construction for urging the brakes to disengaged position.

5. An interlocking tie means for the compression and tension members of a brake beam, comprising a pair of elements disposed on respectively opposite sides of a plane of reference defined by said compression and tension members and having relatively interlocking connecting portions arranged to be engaged and disengaged only by relative sliding of one of said elements with respect to the other along such plane, and a tie rod engaging alined apertures in said elements for locking said elements against disengagement.

6. An interlocking tie means for the compression and tension members of a brake beam, comprising a pair of elements disposed on respectively opposite sides of a plane of reference defined by said compression and tension members, a tie rod controlling certain movements of the brake beam and engaging alined apertures in said elements, said elements having coacting interlocking portions arranged to be engaged and disengaged from each other by relative movement transverse to said tie rod and to be locked against disengagement by the presence of said tie rod in said apertures.

7. A railway truck having a pair of brake beams, a tie connection between said beams comprising a tie rod and a pair of interfitting members for each beam and through which said tie rod passes, said members and tie rod forming an interlocking tie means for each beam.

WILLIAM H. SALE.